J. AMACHER.
BAG MEASURING APPARATUS.
APPLICATION FILED NOV. 16, 1912.

1,072,897.

Patented Sept. 9, 1913.

WITNESSES

INVENTOR
J. Amacher,

UNITED STATES PATENT OFFICE.

JAKE AMACHER, OF CULLOM, ILLINOIS.

BAG-MEASURING APPARATUS.

1,072,897.  Specification of Letters Patent.  Patented Sept. 9, 1913.

Application filed November 16, 1912. Serial No. 731,804.

*To all whom it may concern:*

Be it known that I, JAKE AMACHER, a citizen of the United States, and residing at Cullom, in the county of Livingston and State of Illinois, have invented certain new and useful Improvements in Bag-Measuring Apparatus, of which the following is a specification.

This invention relates to improvements in bag measuring apparatus.

The primary object of the invention is the provision of a device in which the contents of the bag may be measured both as to its weight and bulk, the same taking place in simultaneous operations.

A further object is to provide such an apparatus in which the weight is ascertained of the desired bulk to be contained in a bag.

A further object is to provide a simple and inexpensive device for attaining these results and which suspends the bag from a device having a pre-determined capacity.

With these general objects in view and others that will appear as the nature of the invention is better understood, the same consists in the novel combination and arrangement of parts hereinafter fully described, illustrated in the accompanying drawings, and pointed out in the appended claim.

Figure 1:
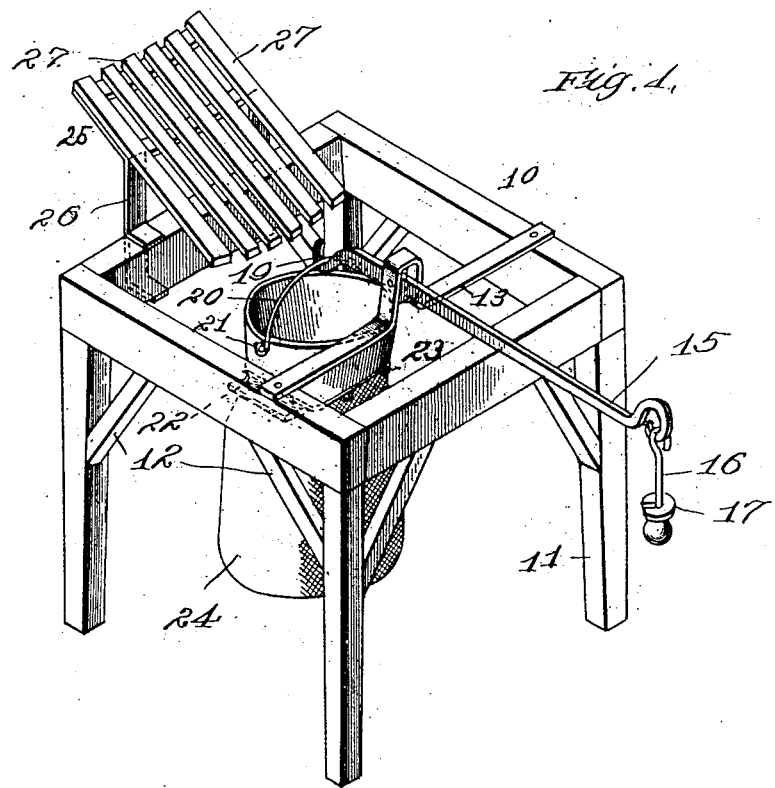
Figure 2:
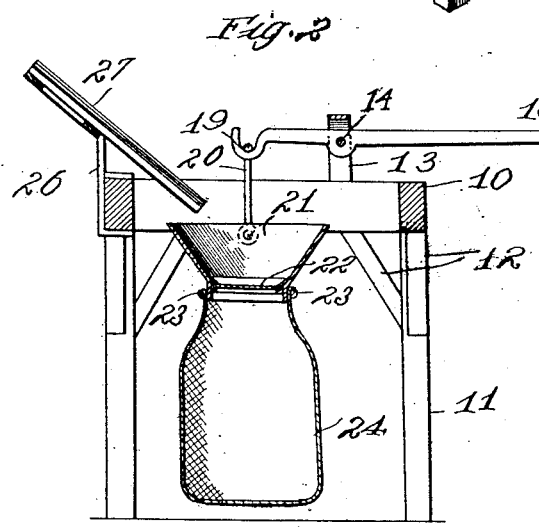
Figure 3:
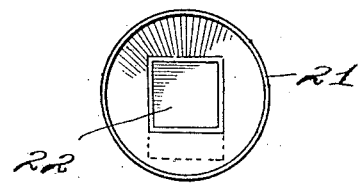

In the drawings forming a part of this application and in which like reference numerals designates corresponding parts throughout the several views: Figure 1 is a perspective view illustrating the bag in position to be filled. Fig. 2 is a vertical central sectional view thereof, and, Fig. 3 is a plan view of the bulk measuring device detached from the apparatus.

Referring in detail to the drawings, a rectangular frame work 10 is preferably provided mounted upon the corner posts 11 and braced by the inclined struts 12, which frame is adapted for supporting the entire elements of the measuring apparatus. A yoke member 13 transversely spans the open rectangular frame 10, being mounted upon the top thereof and pivoted as at 14 upon the yoke is the scale beam 15 of the weighing mechanism. At the outer end of said scale beam, the ordinary weight carrying rod 16 is mounted, being illustrated herein as provided with a single weight member 17. The inner end of the weight beam is provided with an upturned open hook 19 substantially centrally of the rectangular frame 10. This hook is adapted to receive the bail 20 of a bulk measure 21 so that the latter being provided in any desired size is readily suspended from the hook 19 for allowing the contents of the measure to be accurately weighed by the scales hereinbefore described.

The bulk measure 21 is in the form of a hopper and is provided with a sliding bottom 22 while projecting pointed pins or hooks 23 are arranged around the exterior thereof providing means upon which the sack or bag 24 may be easily placed and removed.

An inclined trough or chute 25 which may be V-shaped or any desired convenient form, is mounted upon the frame in longitudinal alinement with the scale beam by means of brackets 26 and is so mounted as to position its lower discharging end adjacent the open top of the hopper and whereby articles placed upon the trough will readily pass to the bulk measure. The chute 25 in the form herein illustrated consists of a plurality of slats 27 slightly spaced apart and is especially adapted for sacking vegetables, such as potatoes, and thus allowing all foreign matter to be sifted out.

The device may be readily employed for bagging powdered articles, such as flour and grain, and in which event, the employment of a solid chute is necessary.

In operation, a bulk measure 21 of the desired size, such for instance, as a bushel measure, is suspended from the scales hook 19 while the bag 24 to be filled is mounted upon the hooks 23 around the lower end of the measure. The measure being then filled with the desired articles which are conducted thereto by means of the trough 25, the exact weight thereof is ascertained by the scales and thereafter the slide 22 is withdrawn and the contents deposited in the bag. Another use for which the device is especially adapted, is merely for weighing out desired quantities and in which case, the scales are set at the desired weight and the goods are deposited in the hopper until the necessary amount is reached and whereupon the scale beam tilts and the bag with its contents having descended, seats itself upon the floor, it of course being noted that in such a use, the slide 22 is not employed.

While the forms of the invention herein shown and described are what are believed to be preferable embodiments thereof, it is nevertheless to be understood that minor changes may be made in the form, proportion and details of construction without departing from the spirit and scope of the invention as set forth in the appended claim.

Having thus described my invention and in what manner the same is designed for use, what I claim as new and desire to secure by Letters Patent of the United States is:—

In a measuring apparatus of the type described, an open rectangular frame comprising side and end bars and having supporting legs, a yoke member spanning the frame being supported on the side bars adjacent one end of the frame, a scale beam mounted in said yoke member and lying above the frame with its measure-supporting end positioned substantially centrally over the center of the frame and its weight-receiving end extending outside the frame beyond one end of the latter, a measuring hopper removably supported on the inner end of said beam, and a chute supported on the opposite end of the frame, said chute disposed above the end bar of the frame on which it is supported and disposed at an incline to discharge into said hopper.

In testimony whereof I affix my signature in presence of two witnesses.

JAKE AMACHER.

Witnesses:
 HENRY AMACHER,
 JOHN AMACHER.

---

Copies of this patent may be obtained for five cents each, by addressing the "Commissioner of Patents, Washington, D. C."